US009063929B2

(12) United States Patent
Saeki et al.

(10) Patent No.: US 9,063,929 B2
(45) Date of Patent: Jun. 23, 2015

(54) INFORMATION PROCESSING APPARATUS, INFORMATION PROCESSING METHOD, COMPUTER-READABLE RECORDING MEDIUM HAVING STORED THEREIN PROGRAM

(71) Applicant: FUJITSU LIMITED, Kawasaki-shi, Kanagawa (JP)

(72) Inventors: Kazue Saeki, Inagi (JP); Masahiro Doteguchi, Yokohama (JP); Tsuyoshi Motokurumada, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 13/936,532

(22) Filed: Jul. 8, 2013

(65) Prior Publication Data
US 2014/0068115 A1 Mar. 6, 2014

(30) Foreign Application Priority Data
Aug. 31, 2012 (JP) .................................. 2012-192392

(51) Int. Cl.
| G06F 13/28 | (2006.01) |
| G06F 13/34 | (2006.01) |
| G06F 9/48 | (2006.01) |
| G06F 13/24 | (2006.01) |
| G06F 9/54 | (2006.01) |

(52) U.S. Cl.
CPC ................ *G06F 13/28* (2013.01); *G06F 13/34* (2013.01); *G06F 9/4812* (2013.01); *G06F 13/24* (2013.01); *G06F 9/544* (2013.01)

(58) Field of Classification Search
None
See application file for complete search history.

(56) References Cited

U.S. PATENT DOCUMENTS

| 6,108,693 A | 8/2000 | Tamura |
| 7,194,598 B2 * | 3/2007 | Jacob ............................. 712/10 |

(Continued)

FOREIGN PATENT DOCUMENTS

| EP | 1936514 A1 | 6/2008 |
| EP | 2189912 A1 | 5/2010 |

(Continued)

OTHER PUBLICATIONS

Extended European Search Report dated Dec. 16, 2014 for corresponding European Patent Application No. 13175508.4, 8 pages.

*Primary Examiner* — Henry Tsai
*Assistant Examiner* — Aurangzeb Hassan
(74) *Attorney, Agent, or Firm* — Fujitsu Patent Center

(57) ABSTRACT

A first computing device includes a data transmission processing unit transmitting data to be transferred to another computing device to a first storage area among the plurality of storage areas, and an interrupt generating unit generating an interrupt corresponding to transmission of data by the data transmission processing unit with respect to a transmission destination of the data together with identification information specifying the storage area, and a second computing device includes an interrupt processing unit specifying from which computing device the interrupt is requested based on the identification information received together with the interrupt when receiving the interrupt, and a data receiving unit reading out data from the first storage area corresponding to the computing device specified by the interrupt processing unit among the plurality of storage areas to efficiently communicate among computing devices in an information processing apparatus including a plurality of computing devices.

16 Claims, 11 Drawing Sheets

(56) References Cited

U.S. PATENT DOCUMENTS

| | | | |
|---|---|---|---|
| 7,379,994 B2* | 5/2008 | Collazo | 709/224 |
| 2003/0061423 A1* | 3/2003 | Rankin et al. | 710/260 |
| 2004/0153888 A1* | 8/2004 | Kadoi | 714/57 |
| 2005/0034039 A1* | 2/2005 | Prasadh et al. | 714/727 |
| 2005/0166033 A1* | 7/2005 | Jacob | 712/11 |
| 2006/0123416 A1* | 6/2006 | Cibrario Bertolotti et al. | 718/1 |
| 2006/0242257 A1* | 10/2006 | Kuribayashi | 709/214 |
| 2008/0162762 A1 | 7/2008 | Neiger et al. | |
| 2008/0189719 A1* | 8/2008 | Shimizuno | 719/312 |
| 2010/0095039 A1 | 4/2010 | Marietta et al. | |
| 2010/0268755 A1* | 10/2010 | Arimilli et al. | 709/203 |
| 2011/0072246 A1* | 3/2011 | Yamada | 712/220 |
| 2012/0089761 A1 | 4/2012 | Ryu et al. | |
| 2012/0311391 A1* | 12/2012 | Abdul et al. | 714/48 |
| 2014/0047116 A1* | 2/2014 | Dain et al. | 709/226 |

FOREIGN PATENT DOCUMENTS

| | | |
|---|---|---|
| JP | 63-059649 | 3/1988 |
| JP | 05-143364 | 6/1993 |
| JP | 07-200494 | 8/1995 |
| JP | 11-120156 | 4/1999 |
| JP | 2000-029850 | 1/2000 |
| JP | 2004-086615 | 3/2004 |
| JP | 2006-301894 | 11/2006 |

* cited by examiner

| BB NUMBER | PRIORITY | |
|---|---|---|
| | LOW SIDE | HIGH SIDE |
| BB#0 | 0 | 31 |
| BB#1 | 1 | 30 |
| BB#2 | 2 | 29 |
| BB#3 | 3 | 28 |
| BB#4 | 4 | 27 |
| BB#5 | 5 | 26 |
| BB#6 | 6 | 25 |
| BB#7 | 7 | 24 |
| BB#8 | 8 | 23 |
| BB#9 | 9 | 22 |
| BB#10 | 10 | 21 |
| BB#11 | 11 | 20 |
| BB#12 | 12 | 19 |
| BB#13 | 13 | 18 |
| BB#14 | 14 | 17 |
| BB#15 | 15 | 16 |

1021

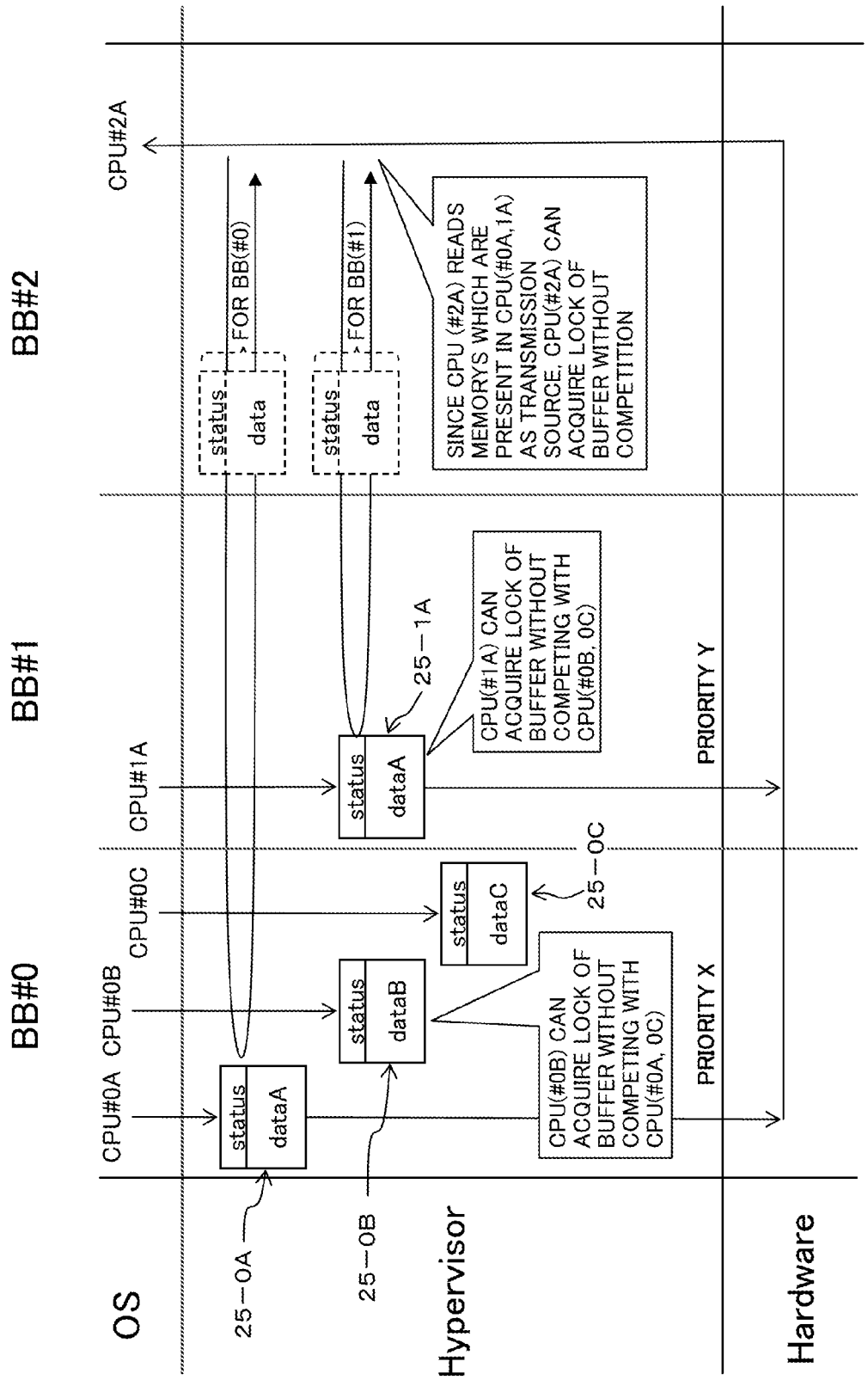

INFORMATION PROCESSING APPARATUS, INFORMATION PROCESSING METHOD, COMPUTER-READABLE RECORDING MEDIUM HAVING STORED THEREIN PROGRAM

CROSS-REFERENCE TO RELATED APPLICATIONS

This application is based upon and claims the benefit of priority of the prior Japanese Patent Application No. 2012-192392, filed on Aug. 31, 2012, the entire contents of which are incorporated herein by reference.

FIELD

The embodiments discussed herein are directed to an information processing apparatus, an information processing method, and a computer-readable recording medium having stored therein a program.

BACKGROUND

In a computer system including a plurality of central processing units (CPUs), when data is transferred among the plurality of CPUs, for example, a CPU of a transmission source writes data in a share memory of a transmission destination and thereafter, generates and notifies an interrupt to a CPU of the transmission destination. The CPU that receives the interrupt accesses the share memory to read out the data written in the memory. Hereinafter, data communications performed among the CPUs may be called a cross call (xcall).

[Patent Literature 1] Japanese Laid-open Patent Publication No. 2004-086615
[Patent Literature 2] Japanese Laid-open Patent Publication No. 11-120156
[Patent Literature 3] Japanese Laid-open Patent Publication No. 2006-301894
[Patent Literature 4] Japanese Laid-open Patent Publication No. 63-059649
[Patent Literature 5] Japanese Laid-open Patent Publication No. 2000-029850

However, in a large-scale computer system including a plurality of CPUs, the number of CPUs increases, and as a result, a time required for the cross call also increases. There is a case in which after an operating system (OS) issues a cross call transmission request, the cross call is not completed within a prescribed time, the OS detects a time-out (cross call time-out), and the system abnormally ends. Therefore, it is desirable to complete the cross call within a short time.

For example, in an information processing apparatus including a building block (BB) including a plurality of CPUs, when the cross call is performed among the CPUs through the BBs, it is desirable that the CPU of the transmission destination can efficiently judge from which CPU included in the BB the interrupt is received. Further, a cross access competition in which data is transmitted to the same CPU from the CPUs of the plurality of BBs may occur, but in this case, it is desirable to prevent only processing of a specific BB from being prioritized.

SUMMARY

As a result, an information processing apparatus includes: a plurality of computing devices; and a plurality of storage areas, and a first computing device among the plurality of computing devices includes a data transmission processing unit storing data to be transferred to another computing device in a first storage area among the plurality of storage areas, and an interrupt generating unit generating an interrupt corresponding to storage of data by the data transmission processing unit with respect to a transmission destination of the data together with identification information specifying the storage area, and a second computing device among the plurality of computing devices includes an interrupt processing unit specifying from which computing device the interrupt is requested based on the identification information received together with the interrupt when receiving the interrupt, and a data receiving unit reading out data from the first storage area corresponding to the computing device specified by the interrupt processing unit among the plurality of storage areas.

Further, an information processing method in an information processing apparatus including a plurality of computing devices and a plurality of storage areas, includes: by a first computing device among the plurality of computing devices, transmitting data to be transferred to another computing device to a first storage area among the plurality of storage areas; generating an interrupt corresponding to transmission of the data with respect to a transmission destination of the data together with identification information specifying the storage area, and by a second computing device among the plurality of computing devices, specifying from which computing device the interrupt is requested based on the identification information received together with the interrupt when receiving the interrupt; and reading out data from the first storage area corresponding to the computing device specified by an interrupt processing unit among the plurality of storage areas.

In addition, a computer-readable recording medium having stored therein a program that allows a computer including a plurality of computing devices and a plurality of storage areas to execute processing includes: transmitting data to be transferred to another computing device to a first storage area among the plurality of storage areas; and generating an interrupt corresponding to transmission of the data with respect to a transmission destination of the data together with identification information specifying the storage area.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11 is a diagram describing a method for transferring data among CPUs in an information processing apparatus as one example of a second embodiment.

DESCRIPTION OF EMBODIMENTS

Figure 1:
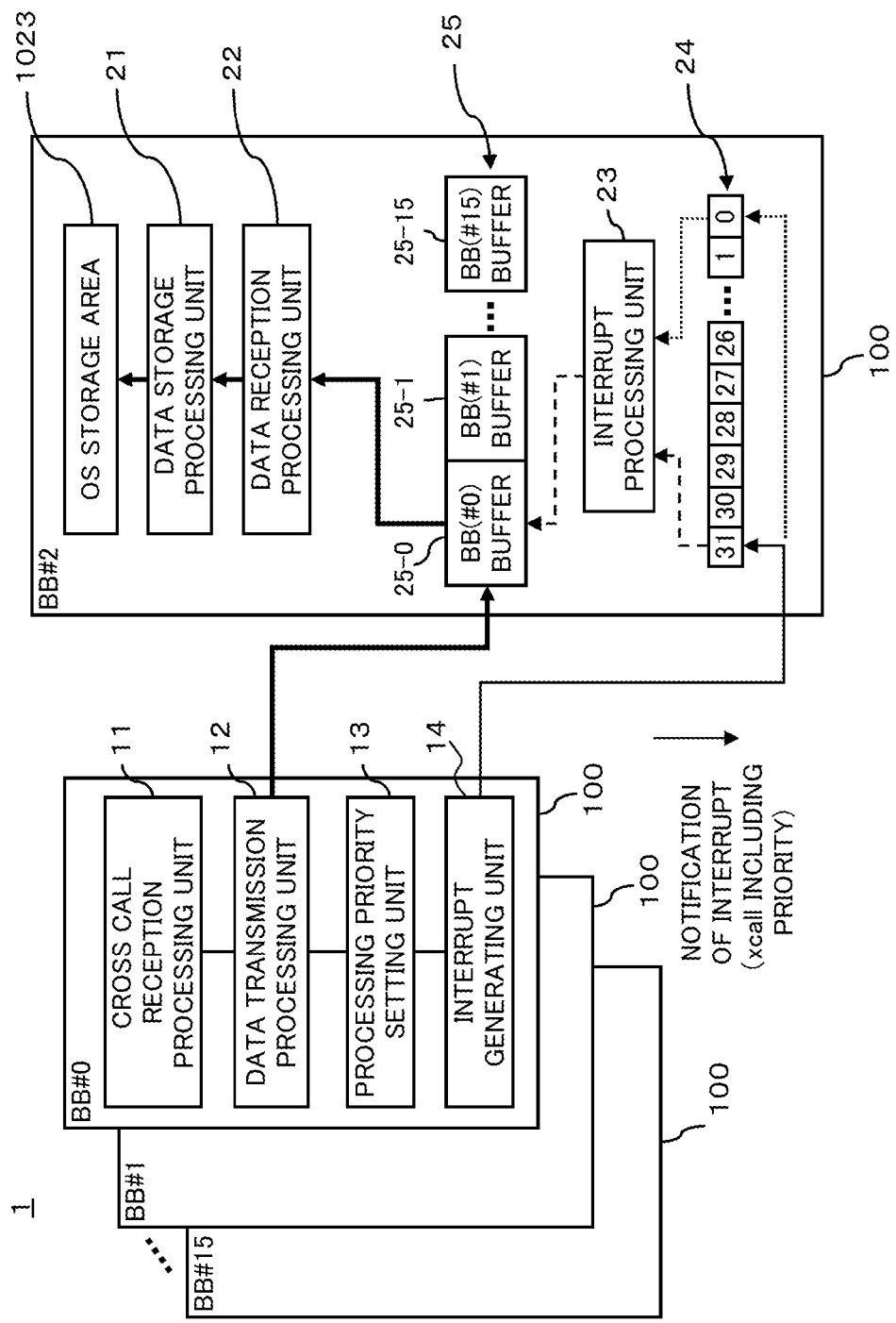
FIG. 1 is a diagram schematically illustrating a functional configuration of an information processing apparatus as one example of a first embodiment.

Hereinafter, an information processing apparatus, an information processing method, and a program according to embodiments will be described with reference to the drawings. However, the embodiments described below are just examples and applications of various modified examples or technologies which are not described in the embodiments are not intended to be excluded. That is, the embodiments may be variously modified (the embodiments and the modified examples may be combined) to be implemented within a scope without departing from the spirit. Further, in each drawing, only constituent members illustrated in the drawing are not provided but other functions may be included.

(A) First Embodiment

Figure 2:
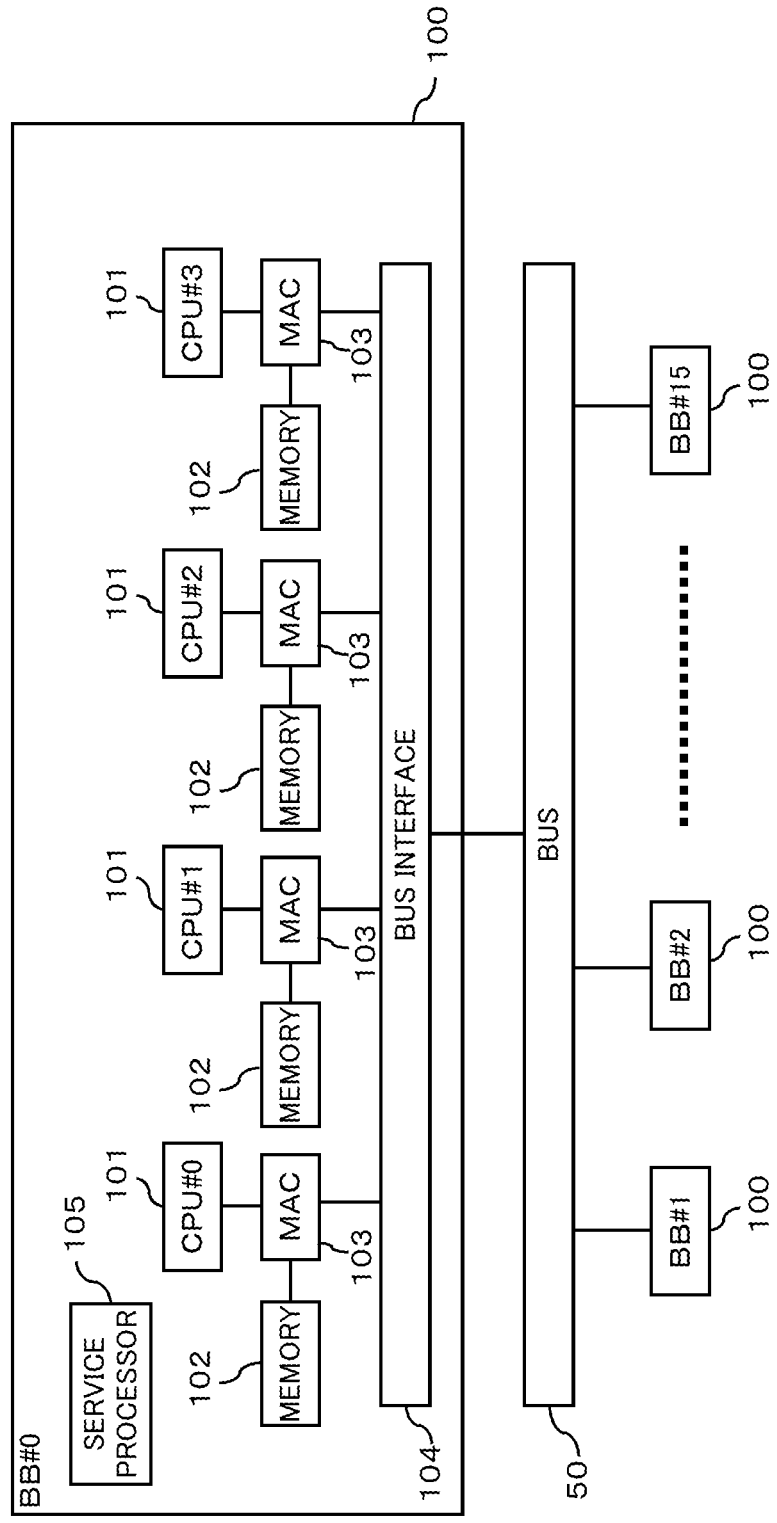
FIG. 2 is a diagram exemplifying a hardware configuration of the information processing apparatus as one example of the first embodiment.

FIG. 1 is a diagram schematically illustrating a functional configuration of an information processing apparatus 1 as one example of a first embodiment. FIG. 2 is a diagram exemplifying a hardware configuration of the information processing apparatus.

As one example of the first embodiment, the information processing apparatus 1 includes a plurality of (sixteen of #0 to #15, in the example illustrated in FIG. 2) building blocks (BB) 100, as illustrated in FIG. 2. The plurality of BBs #0 to #15 are connected to communicate with each other through a bus 50.

The BB is one of hardware configuring units and configures a node (computer node). The plurality of BBs 100 are, for example, system boards, and the like and has the same configuration as each other. FIG. 2 illustrates only a hardware configuration of a BB #0, for convenience. The configuration of the BB or the node is not limited to the configuration of FIG. 2 and may include various configurations. For example, the configuration of the BB or the node may be a configuration without a service processor 105, and a plurality of CPUs 101 or a plurality of memories 102 connected to a bus interface 104 may be placed on one system board or a function block including a plurality of circuit boards in which the CPU or the memory is installed may be set as the BB or the node.

Note that, hereinafter, as a reference numeral representing the BB, reference numerals #0 to #15 are used when one of the plurality of BBs needs to be specified, but a reference numeral 100 is used at the time of indicating any BB.

As illustrated in FIG. 2, the BB 100 includes the service processor 105, the bus interface 104, one or more (four of #0 to #3 in the example illustrated in FIG. 2) CPUs 101, one or more (four in the example illustrated in FIG. 2) memory access controllers (MACs) 103, and one or more (four in the example illustrated in FIG. 2) memories 102.

Each of the CPU 101 and the memory 102 is connected to the bus interface 104 through the MAC 103. Further, the bus interface 104 is connected to communicate with the bus 50. The bus 50 is, for example, a cross bar. However, the bus 50 is not limited thereto and may be, for example, another bus architecture such as a peripheral component interconnect (PCI) bus, or the like.

The bus interface 104 is an interface which conforms to a standard of the bus 50 and for example, a cross bar interface.

The service processor 105 is a processing device that manages the BB 100, and for example, monitors an error in the BB 100 and performs notification to the outside or recovery processing when the error occurs.

The MAC 103 is a control device that controls data access to the memory 102 and writes or reads out data in or to the memory 102 in accordance with a data access request from the CPU 101, or the like.

The memory 102 is a storage device including a ROM and a RAM. A software program relating to communication control or data for the program is written in the ROM of the memory 102. The software program on the memory 102 is appropriately read and executed in the CPU 101. Further, the RAM of the memory 102 is used as a primary storage memory or a working memory.

Note that, data is written or read out in or to the memory 102 even from another CPU 101 as well as the CPU 101 connected to the same MAC 103. In addition, data is written or read out in or to the memory 102 even from the CPU 101 provided in another BB 100 as well as the CPU 101 provided in the same BB 100. Further, in the information processing apparatus 1, as described below, when data is transferred among the CPUs 101, data is transferred through the memory 102. That is, the memory 102 serves as a share memory shared and used by the plurality of CPUs 101.

Further, it is assumed that the CPU 101 preferentially uses the memory 102 connected to the same MAC 103. Hereinafter, the memory 102 connected to the same MAC 103 as the CPU 101 may be referred to as a priority memory 102.

Figure 3:
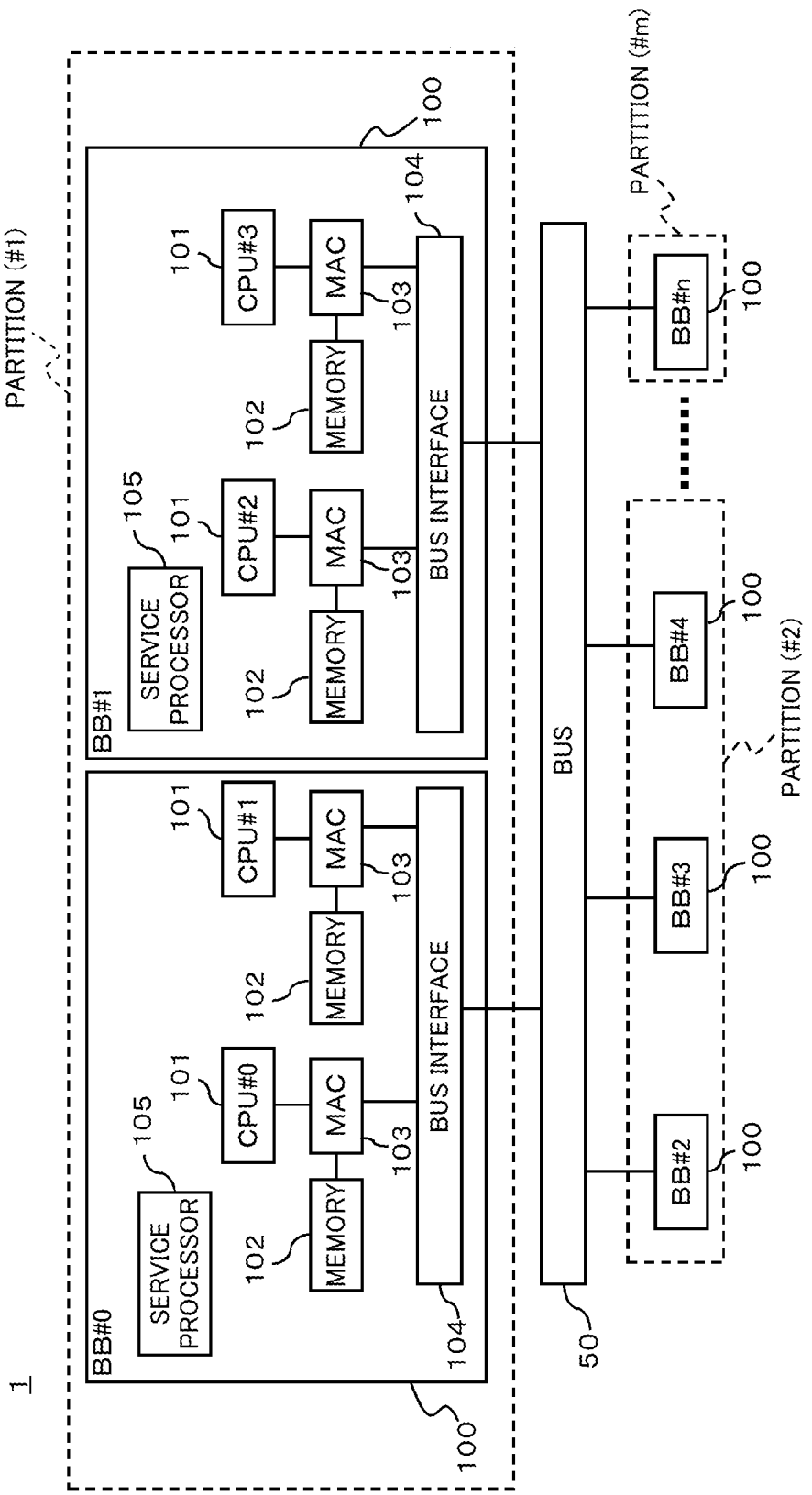
FIG. 3 is a diagram illustrating another example of the hardware configuration of the information processing apparatus as one example of the first embodiment.

FIG. 3 is a diagram illustrating another example of the hardware configuration of the information processing apparatus as one example of the first embodiment. In the example illustrated in FIG. 3, each BB 100 includes each two CPUs 101, MACs 103, and memories 102. Further, in the example illustrated in FIG. 3, the information processing apparatus 1 includes n+1 (however, n is an integer of 0 or more) BBs (#0 to #n). The plurality of BBs may be divided into several partitions. Herein, the same OS as the partition operates and when viewed from the OS which operates, a group of building blocks operate as one system. For example, in the example illustrated in FIG. 3, the BB #0 and the BB #1 operate as a partition #1, the BB #2 to the BB #4 operate as a partition #2, and further, the BB #n operates as a partition #m (however, m is a natural number of 1 or more). Herein, an OS operated by the BBs included in the partition #1 identifies that the BB #0 and the BB #1 operate as one system and an OS operated by the BBs included in the partition #2 identifies that the BB #2 to the BB #4 operate as one system. Similarly, an OS operated by the BB included in the partition #m identifies that the BB #n operates as one system.

Figure 4:
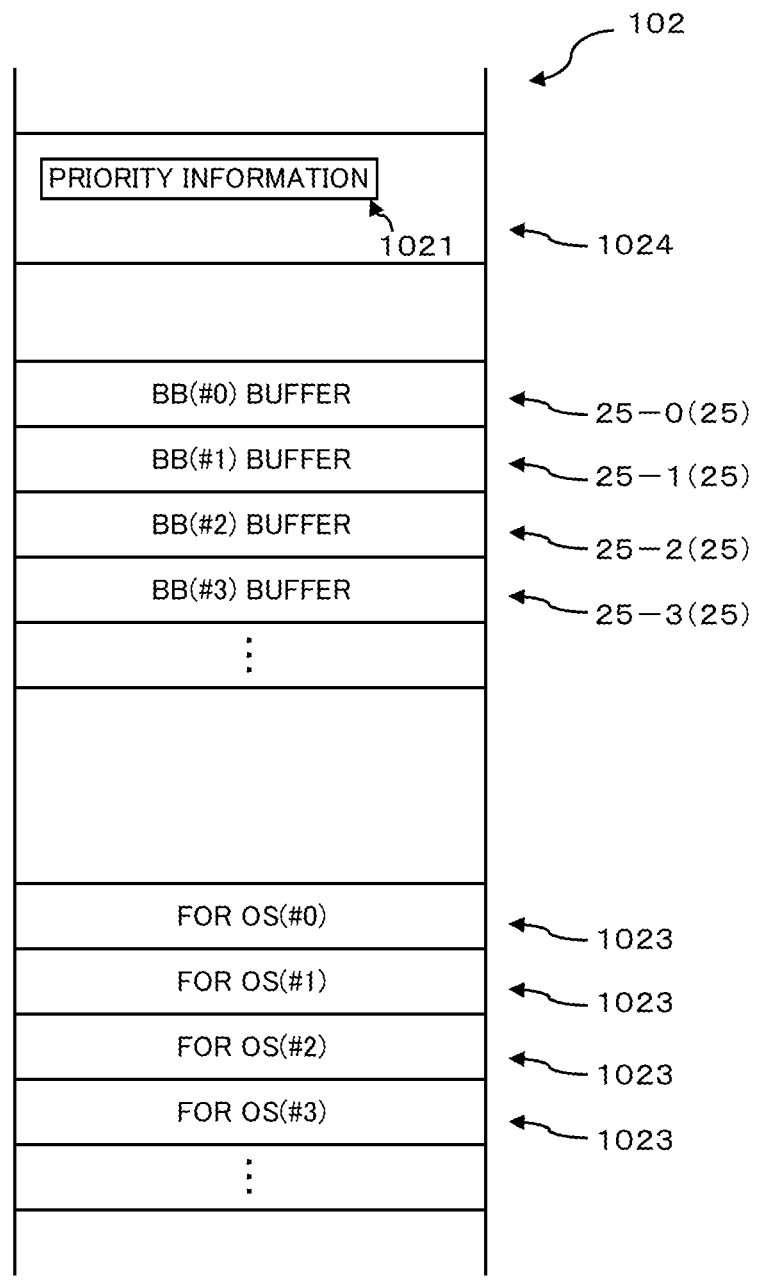
FIG. 4 is a diagram illustrating a use example of a memory of the information processing apparatus as one example of the first embodiment.

FIG. 4 is a diagram illustrating a use example of the memory 102 of the information processing apparatus 1 as one example of the first embodiment. As illustrated in FIG. 4, the memory 102 includes a receiving buffer area 25 (25-0 to 25-15) installed for each BB 100 and an OS area 1023 installed for each OS and further, includes an area 1024 storing priority information 1021. Hereinafter, in the first embodiment, if not particularly limited, the receiving buffer area is called a buffer area or simply called a buffer.

The OS area 1023 is an area storing data used by the OS. When a plurality of OSs are executed in the BB 100, a plurality of OS areas 1023 corresponding to the OSs (OSs #0 to #3 in the example illustrated in FIG. 4), respectively, are provided as illustrated in FIG. 4. That is, the OS area 1023 is provided for each OS executed by the BB 100.

For example, a copy of data which is read out from the buffer area 25 is stored in the OS area 1023 by a data storage processing unit 21 to be described below. The OS reads out data from the OS area 1023 used by the OS itself among the plurality of OS areas 1023 and uses the read-out data.

The buffer area 25 is an area storing data transferred to the CPU 101 and data transferred from another CPU 101 is stored in the buffer area 25.

In the first embodiment, a storage area of a part of the memory 102 (priority memory 102) connected to the same MAC 103 as a CPU 101 of a transmission destination of data serves as the buffer area 25. Hereinafter, in transferring data among the plurality of CPUs 101, a CPU 101 at a side that transmits data is called a transmission source CPU 101 and a CPU 101 at a side that receives data is called a transmission destination CPU 101.

The buffer area 25 is provided to correspond to each BB 100 provided in the information processing apparatus 1. For example, the buffer area 25-0 is provided to correspond to the BB #0 and the buffer area 25-1 is provided to correspond to the BB #1. Similarly, the buffer areas 25-2 to 25-15 are provided to correspond to the BBs #2 to #15, respectively.

Note that, as reference numerals representing the buffer areas, when one of the plurality of buffer areas needs to be specified, reference numerals 25-0 to 25-15 are used, but the reference numeral 25 is used at the time of indicating any buffer area. The buffer area 25 is provided for each BB 100.

Figure 5:
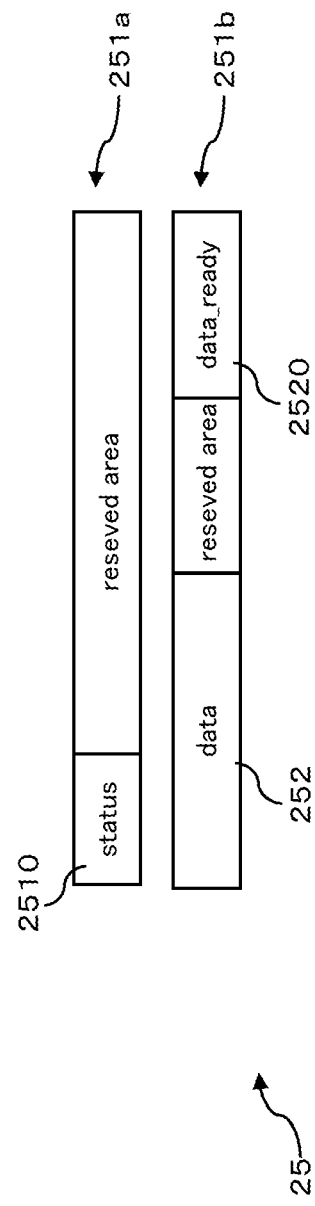
FIG. 5 is a diagram exemplifying a data configuration written in a buffer area of the information processing apparatus as one example of the first embodiment.

FIG. 5 is a diagram exemplifying a data configuration written in the buffer area 25 of the information processing apparatus 1 as one example of the first embodiment.

First data 251a and second data 251b are stored in each buffer area 25, as illustrated in FIG. 5.

The first data 251a includes an assignable area (reserved area) apart from a status 2510 indicating a status of the buffer area 25. As the status 2510, information indicating any one of "free", "ready", and "busy" is stored.

Herein, "free" indicates a status in which the buffer area 25 is not locked and indicates a status capable of acquiring an authority to lock and use the buffer area 25 in order to write data in the buffer area 25. "ready" indicates a status (lock status) in which the authority to write data in the buffer area 25 is completely acquired and indicates a status in which data is able to start being written in the buffer area 25. "busy" indicates that data is being written in the buffer area 25. Information of the status 2510 is updated by, for example, a data transmission processing unit 12 to be described below.

The second data 251b includes data 252, data_ready 2520, and a separately assignable area (reserved area). The data 252 is data transferred from another CPU 101. The data_ready 2520 indicates a status of the data 252 and for example, stores information indicating any one of "false" and "true". In transferring data among the CPUs 101, the transmission destination CPU 101 accesses the data_ready 2520 in order to open the buffer area 25. Note that, the data_ready 2520 is known and is not described in detail.

The status 2510, which is information accessed by the transmission source CPU 101, is stored in the first data 251a, in transferring data among the CPUs 101. Meanwhile, the data 252 and the data_ready 2520, which are information accessed by the transmission destination CPU 101, are stored in the second data 251b, in transferring data among the CPUs 101.

Further, each of the first data 251a and the second data 251b is configured to be the same size as a cache line size of the CPU 101. That is, the first data 251a and the second data 251b are placed to become each line on a cache.

As a result, in transferring data among the CPUs 101, access by the transmission source CPU 101 to the status 2510 and access by the transmission destination CPU 101 to the data 252 or the data_ready 2520 are independently performed.

For example, the transmission source CPU 101 takes lock in order to write data in the buffer area 25 and changes the status 2510 from "free" to "busy".

Further, when storing data in the buffer area 25 is completed, the transmission source CPU 101 changes the status 2510 from "busy" to "ready". Further, the transmission source CPU 101 changes the data_ready 2520 from "false" to "true" and applies an interrupt to the transmission destination CPU 101 (xcall). The transmission destination CPU 101 verifies that the data_ready 2520 is set as "true" as a free interrupt measure.

Further, when reading-out of data from the buffer area 25 is completed, the transmission destination CPU 101 changes the status 2510 from "busy" to "free" and opens the buffer area 25.

As such, when data is transferred from the transmission source CPU 101 to the transmission destination CPU 101 through the buffer area 25, simultaneous access by the transmission source CPU 101 and the transmission destination CPU 101 to the same cache line is prevented. As a result, occurrence of lock competition for accessing the buffer area 25 may be suppressed between the transmission source CPU 101 and the transmission destination CPU 101. That is, false sharing by the transmission source CPU 101 and the transmission destination CPU 101 may be avoided and processing delay caused by the lock competition by the transmission source CPU 101 and the transmission destination CPU 101 may be relieved.

Further, the data 252 and the data_ready 2520 are provided in the second data 251b, and as a result, the data 252 and the data_ready 2520 are placed on the same line on the cache and the transmission destination CPU 101 may obtain the data 252 and the data_ready 2520 through one access. Therefore, an access frequency to the buffer area 25 may be reduced.

The priority information 1021 is information indicating the order of priority of each BB 100 provided in the information processing apparatus 1.

Figure 6:
FIG. 6 is a diagram exemplifying priority information in the information processing apparatus as one example of the first embodiment.

FIG. 6 is a diagram exemplifying the priority information 1021 in the information processing apparatus 1 as one example of the first embodiment.

In the information processing apparatus 1, unique priority not to be duplicated with each other is, in advance, set for each BB 100, as exemplified in FIG. 6. Further, two (two types of) priorities are set in each BB 100.

In the example illustrated in FIG. 6, integers 0 to 15 are set for the BBs #0 to #15 as first priority, respectively and integers 31 to 16 are set for the BBs #0 to #15 as second priority, respectively Further, it is assumed that in the priorities 0 to 31 exemplified in FIG. 6, as a numeral value of the priority is larger, the order of priority is higher. Hereinafter, among the priorities set in the respective BBs 100, the priorities 0 to 15 are referred to as low-side priorities (first priority information) and the priorities 16 to 31 are referred to high-side priorities (second priority information). The high-side priorities 16 to 31 are higher than any priority of the low-side priorities 0 to 15.

For example, two priorities of the priority 0 indicating the lowest priority and the priority 31 indicating the highest priority are set in the BB #0 as a pair and two priorities of the low-side priority 3 and the high-side priority 28 are set in the BB #3 as a pair.

Any one of the two priorities set for the respective BBs 100 is randomly selected by a processing priority setting unit 13 to be described below. Hereinafter, the priority selected by the processing priority setting unit 13 may be called an interrupt level.

Further, as described above, the priorities set in the respective BBs 100 are set as unique values not to be duplicated for the respective BBs 100. As a result, the BBs 100 may be specified from the priorities. That is, the priorities are used as node identification information specifying nodes.

Further, as illustrated in FIG. 4, the buffer areas 25 are provided in the priority memory 102 to correspond to the BBs 100, respectively. As a result, the priority serves as identification information indirectly specifying the buffer (storage area) 25.

Further, a partial storage area of the memory 102 is used even as an interrupt priority order queue 24 illustrated in FIG. 1. The interrupt priority order queue 24 includes a plurality of queues which corresponds to the aforementioned respective priorities of the priority information 1021. In the example illustrated in FIG. 1, the interrupt priority order queue 24 corresponds to the priorities 0 to 31 of the priority information 1021 illustrated in FIG. 6 and includes 32 queues. In FIG. 6, any one numerical value of 0 to 31 corresponding to the priorities 0 to 31 is denoted to each queue of the interrupt priority order queue 24. Each queue of the interrupt priority order queue 24 corresponds to the interrupt level.

A flag (for example, "1") is set in each queue of the interrupt priority order queue 24 by the processing priority setting unit 13 to be described below.

The priority order is set in each queue of the interrupt priority order queue 24 and in the embodiment, queues set with large numerical values among the queues set with the flags by the processing priority setting unit 13 are preferentially processed by an interrupt processing unit 23 to be described below.

Note that, as the interrupt priority order queue 24, only the partial storage area of the memory 102 is not limited to be used but various other storage devices may be used.

The CPU 101 is a computing device that performs various controls or computations and implements various functions by executing the OS or a control program (hypervisor, HV) stored in the memory 102.

The hypervisor is a control program for implementing a virtual machine which is one of virtualization technologies of a computer and manages an OS (virtual OS) throughout the plurality of BBs 100.

In the information processing apparatus 1, each CPU 101 serves as the transmission source CPU 101 that transmits data to other CPUs 101 and serves even as the transmission destination CPU 101 that transmits data transmitted from other CPUs 101.

When the CPU 101 serves as the transmission source CPU 101, the CPU 101 serves as a cross call reception processing unit 11, the data transmission processing unit 12, the processing priority setting unit 13, and an interrupt generating unit 14, as illustrated in FIG. 1. Further, when the CPU 101 serves as the transmission destination CPU 101, the CPU 101 serves as the interrupt processing unit 23, a data reception processing unit 22, and the data storage processing unit 21, as illustrated in FIG. 1.

The CPU 101 executes the hypervisor extended on the memory 102 as the control program to serve as the cross call reception processing unit 11, the data transmission processing unit 12, the processing priority setting unit 13, the interrupt generating unit 14, the interrupt processing unit 23, the data reception processing unit 22, and the data storage processing unit 21. That is, in the information processing apparatus 1 of the first embodiment, the cross call reception processing unit 11, the data transmission processing unit 12, the processing priority setting unit 13, the interrupt generating unit 14, the interrupt processing unit 23, the data reception processing unit 22, and the data storage processing unit 21 are implemented as the function of the hypervisor.

Note that, the control program (hypervisor) for implementing the functions as the cross call reception processing unit 11, the data transmission processing unit 12, the processing priority setting unit 13, the interrupt generating unit 14, the interrupt processing unit 23, the data reception processing unit 22, and the data storage processing unit 21 is provided while the program is recorded in computer-readable recording media such as, for example, a flexible disk, CDs (a CD-ROM, a CD-R, a CD-RW, and the like), DVDs (a DVD-ROM, a DVD-RAM, a DVD-R, a DVD+R, a DVD-RW, a DVD+RW, an HD DVD, and the like), a Blu-ray disk, a magnetic disk, an optical disk, an optic-magnetic disk, and the like. Then, the computer reads the program from the recording media and thus transmits the read program to an internal memory device or an external memory device, which is stored and used. Further, the program may be recorded in the memory devices (recording media) such as, for example, the magnetic disk, the optical disk, the optic-magnetic disk, and the like and may be provided to the computer from the memory devices through communication routes.

When implementing the functions as the cross call reception processing unit 11, the data transmission processing unit 12, the processing priority setting unit 13, the interrupt generating unit 14, the interrupt processing unit 23, the data reception processing unit 22, and the data storage processing unit 21, a program stored in an internal storage device (the memory 102 in the embodiment) is executed by a microprocessor (the CPU 101 in the embodiment) of the computer. In this case, the computer may read the program recorded in the recording medium to execute the read program.

Note that, in the embodiment, the computer is a concept that includes hardware and an operating system and represents hardware that operates under the control of the operating system. Further, when the operating system is unnecessary, and thus an application program singly operates the hardware, the hardware itself corresponds to the computer. The hardware at least includes the microprocessor such as the CPU, or the like and method for reading the computer program recorded in the recording medium and in the embodiment, the information processing apparatus 1 or the BB 100 has a function as the computer.

The cross call reception processing unit 11 receives a cross call transmission request from the OS.

The data transmission processing unit 12 transmits data to be transferred to the transmission destination CPU 101. In detail, the data transmission processing unit 12 writes data in the buffer area 25 corresponding to the BB 100 provided in the transmission source CPU 101 in the priority memory 102 corresponding to the transmission destination CPU 101.

Further, the data transmission processing unit 12 updates the status 2510 of the buffer area 25, or the like. For example, the data transmission processing unit 12 first obtains lock of the target buffer area 25 to change the status 2510 of the buffer area 25 from "free" to "busy" when writing data in the buffer area 25. In addition, the data transmission processing unit 12 changes the data_ready 2520 from "false" to "true" when completes writing data in the buffer area 25.

The processing priority setting unit 13 determines the transmission destination CPU 101 based on the cross call transmission request which the cross call reception processing unit 11 receives from the OS. Note that, the determination of the transmission destination CPU 101 may be implemented by a known method and will not be described in detail. In addition, the processing priority setting unit 13 randomly selects one priority from a plurality of (two in the embodiment) priorities which is previously assigned to the own BB 100, by referring to, for example, the priority information 1021. That is, the processing priority setting unit 13 sets the interrupt level.

The interrupt generating unit 14 notifies the interrupt to the transmission destination CPU 101 when the aforementioned data transmission processing unit 12 transmits (stores) data to (in) the buffer area 25 associated with the transmission destination CPU 101 and updates the status 2510 of the buffer area 25, or the like.

The interrupt generating unit 14 performs the interrupt notification accompanied by the priority selected by the processing priority setting unit 13 to the transmission destination CPU 101. In detail, the interrupt generating unit 14 sets the flag "1" in a queue corresponding to the priority selected by the processing priority setting unit 13 among the queues of the interrupt priority order queue 24 of the priority memory 102 corresponding to the transmission destination CPU 101, for example.

In the transmission destination CPU 101, when the interrupt is performed from the transmission source CPU 101 (interrupt generating unit 14) and the flag "1" is set in the interrupt priority order queue 24, the interrupt processing unit 23 specifies from which BB 100 an interrupt processing request is input. In detail, the interrupt processing unit 23 judges which interrupt level (priority) the queue with the set flag in the interrupt priority order queue 24 corresponds to.

The interrupt processing unit 23 specifies the priority corresponding to the queue with the set flag and further, specifies the BB 100 corresponding to the specified priority. The interrupt processing unit 23 notifies the buffer area 25 corresponding to the specified BB 100 to the data reception processing unit 22.

The data reception processing unit 22 refers to the buffer area 25 notified by the interrupt processing unit 23 and verifies that writing data is completed in the data 252. In detail, the data reception processing unit 22 verifies whether "ready" is set in the status 2510 of the target buffer area 25 and when "ready" is set, the data reception processing unit 22 judges that writing data is completed.

When the data reception processing unit 22 verifies that writing data in the buffer area 25 is completed by the data transmission processing unit 12, the data reception processing unit 22 reads out data from the data 252 of the specified buffer area 25. Further, the data storage processing unit 21 stores a copy of the data read out from the buffer area 25 in the OS area 1023 corresponding to the OS executed by the transmission destination CPU 101. Thereafter, the data storage processing unit 21 accesses the data_ready 2520 of the buffer area 25 to be processed and releases the buffer area 25. Note that, the data copied to the OS area 1023 is processed by the OS.

In the information processing apparatus 1 as one example of the first embodiment configured as above, processing at the transmission-side CPU 101 will be described in accordance with a flowchart (steps A1 to A6) illustrated in FIG. 8 while referring to FIG. 7.

Figure 7:
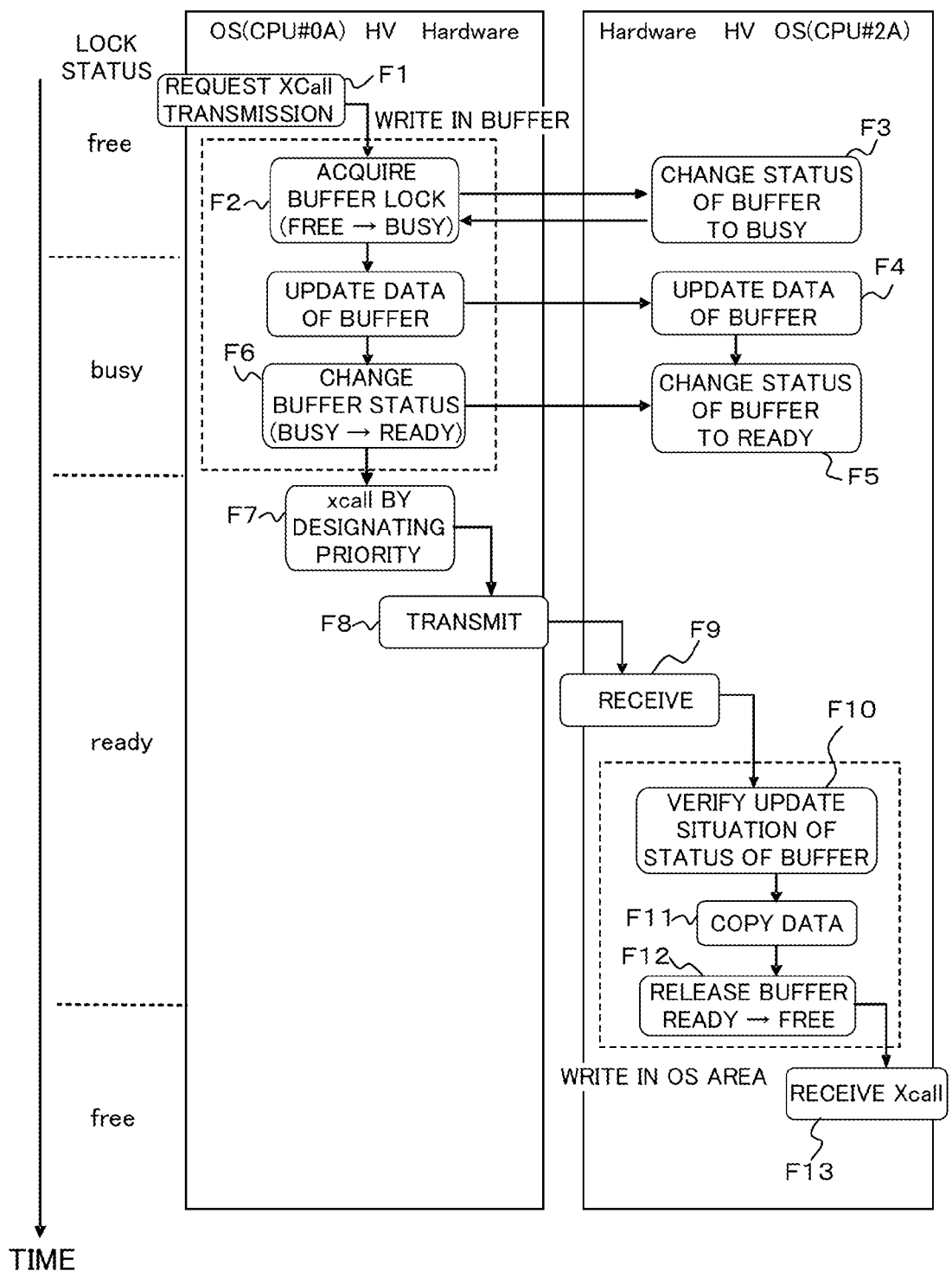
FIG. 7 is a diagram illustrating a flow of cross call processing in the information processing apparatus as one example of the embodiment.
Figure 8:
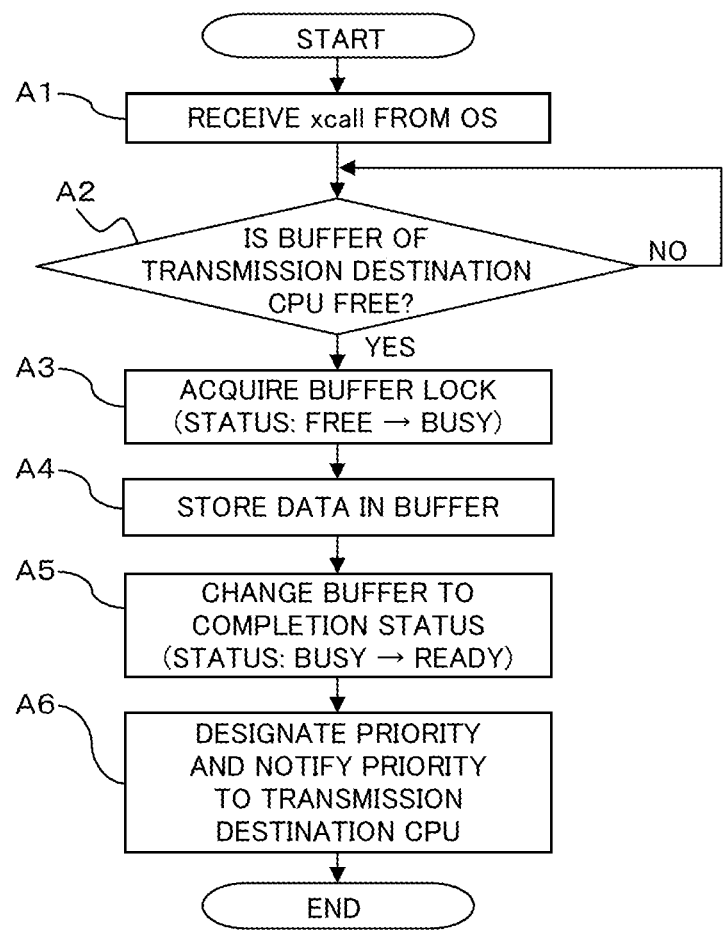
FIG. 8 is a flowchart describing processing in a transmitting-side CPU in the information processing apparatus as one example of the first embodiment.

Note that, FIG. 7 is a diagram illustrating a flow of cross call processing in the information processing apparatus 1 as one example of the embodiment. In FIG. 7, a CPU (#0A), which is the transmission source CPU 101, is illustrated at a left side in the figure and further, a CPU (#2A), which is the transmission destination CPU 101, is illustrated at a right side in the figure.

In the transmission source CPU 101, first, the cross call reception processing unit 11 receives the cross call from the OS (step A1; see reference numeral F1 of FIG. 7).

In step A2, the data transmission processing unit 12 verifies whether the buffer area 25 corresponding to the BB 100 of the transmission source CPU 101 is free in the priority memory 102 corresponding to the transmission destination CPU 101. In detail, the data transmission processing unit 12 verifies whether "free" is stored in the status 2510 and when the status 2510 is not "free" (see route No of step A2), step A2 is repeatedly performed.

When the status 2510 is "free" (see route YES of step A2), the data transmission processing unit 12 acquires the lock of the buffer area 25 (see reference numeral F2 of FIG. 7) to change the status 2510 of the buffer area 25 from "free" to "busy" (step A3; see reference numeral F3 of FIG. 7).

Further, in step A4, the data transmission processing unit 12 writes the data 252 in the buffer area 25 of the transmission destination CPU 101 to update the data 252 (see reference numeral F4 of FIG. 7). When storing data in the buffer area 25 is completed, in step A5, the data transmission processing unit 12 changes the status 2510 of the buffer area 25 from "busy" to "ready" (see reference numeral F5 of FIG. 7) to change the status of the buffer area 25 (see reference numeral F6 of FIG. 7).

The processing priority setting unit 13 randomly selects one priority from a plurality of (two in the embodiment) priorities previously assigned to the own BB 100 and sets the level of the interrupt (see reference numeral F7 of FIG. 7).

Herein, two types of high and low priorities are prepared for each BB 100 and the processing priority setting unit 13 randomly selects one priority of two types of priorities to evenly process data transmitted from the plurality of BBs 100 without preferentially executing processing of a specific transmission source CPU 101.

Further, the processing priority setting unit 13 performs the interrupt notification accompanied by the selected priority to the transmission destination CPU 101 (step A6). As a result, the interrupt is notified to the transmission destination CPU 101 by hardware (see reference numeral F8 of FIG. 7). The processing priority setting unit 13 sets a flag in a queue corresponding to the selected priority among the queues of the interrupt priority order queue 24 of the priority memory 102 corresponding to the transmission destination CPU 101, and the processing ends.

Figure 9:
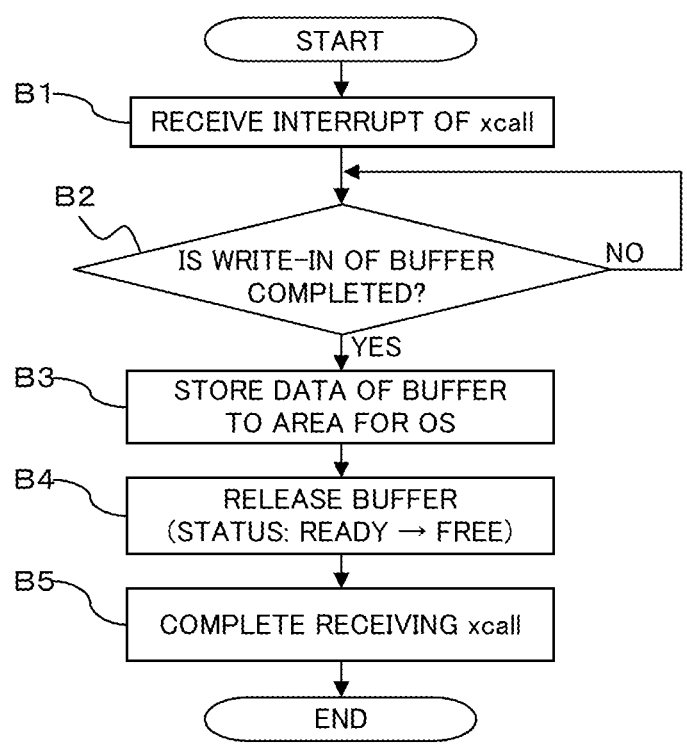
FIG. 9 is a flowchart describing processing in a receiving-side CPU in the information processing apparatus as one example of the first embodiment.

Subsequently, in the information processing apparatus 1 as one example of the first embodiment, processing at the reception-side CPU 101 will be described in accordance with a flowchart (steps B1 to B5) illustrated in FIG. 9 while referring to FIG. 7.

In step B1, when the transmission destination CPU 101 receives the interrupt from the transmission source CPU 101 (see reference numeral F9 of FIG. 7), the interrupt processing unit 23 specifies from which BB 100 an interrupt processing request is input by referring to the interrupt priority order queue 24, in the transmission destination CPU 101. That is, the interrupt processing unit 23 specifies the priority corresponding to the queue with the set flag and further, specifies the BB 100 corresponding to the specified priority.

In step B2, the data reception processing unit 22 verifies that writing data is completed by referring to the buffer area 25 notified by the interrupt processing unit 23 (see reference numeral F10 of FIG. 7). In detail, the data reception processing unit 22 verifies whether "ready" is stored in the status 2510 and when the status 2510 is not "ready" (see route No of step B2), step B2 is repeatedly performed.

In the transmission destination CPU 101, it may be specified which BB 100 data is stored in the buffer area 25 corresponding to by the priority of the interrupt priority order queue 24. In the transmission destination CPU 101, the data reception processing unit 22 checks only the status 2510 of the buffer area 25 corresponding to the target BB 100, and may verify the status 2510 within a short time and rapidly perform read-out processing by the transmission destination CPU 101.

When the status 2510 is "ready" (see route YES of step B2), the data storage processing unit 21 stores the copy of the data read out from the buffer area 25 in the OS area 1023, in step B3. Thereafter, the data storage processing unit 21 changes the status 2510 of the buffer area 25 from "ready" to "free" and releases the buffer area 25, in step B4 (see reference numeral F12 of FIG. 7). Thereafter, in step B5, receiving the cross call is completed (see reference numeral F13 of FIG. 7) and the processing ends.

Figure 10:
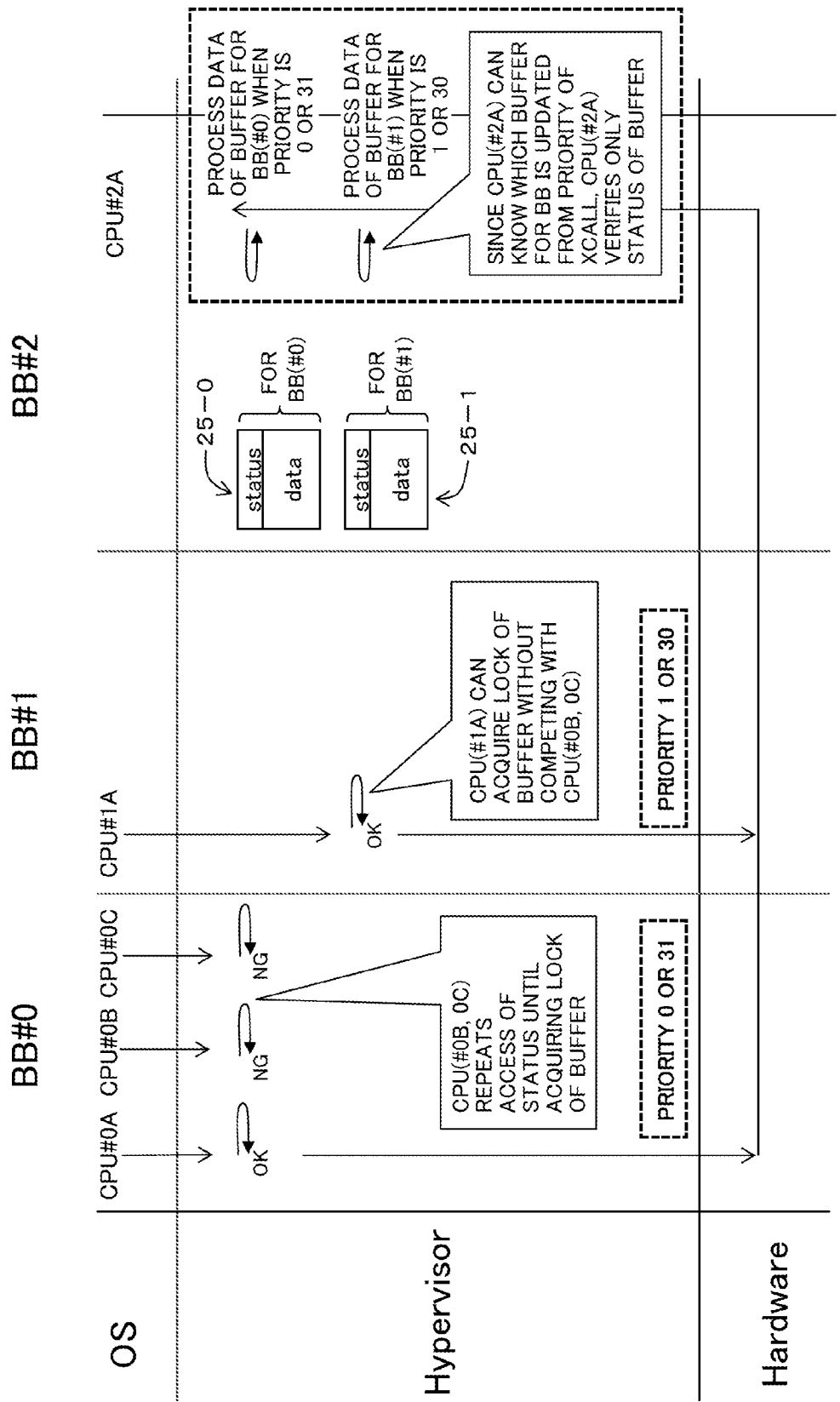
FIG. 10 is a diagram describing a method for transferring data among CPUs in the information processing apparatus as one example of the first embodiment.

FIG. 10 is a diagram describing a method for transferring data among the CPUs 101 in the information processing apparatus 1 as one example of the first embodiment.

In the example illustrated in FIG. 10, the priorities 0 and 31 are set in the BB #0 and the priorities 1 and 30 are set in the BB #1.

Further, in the BB (#0), each of CPUs #0A, #0B, and #0C intends to transfer data to a CPU #2A of a BB #2 and among them, the CPU #0A obtains lock of the buffer area 25-0 for the BB #0 provided in the BB #2.

Further, the CPU #0A randomly selects any one priority from the priorities "0" and "31" which are previously set in the BB #0 and performs interrupt notification accompanied by the selected priority to the CPU #2A.

Note that, until each of the CPUs #0B and #0C which do not obtain the lock is able to take the lock of the buffer area 25-0, the CPUs #0B and #0C repeatedly access the status 2510.

In the information processing apparatus 1, the CPU #2A includes the buffer area 25 for each BB 100. As a result, even though the CPU #0A obtains the lock of the buffer area 25-0 for the BB #0, the CPU #1A of the BB #1 may obtain lock of the buffer area 25-1 for the BB #1 provided in the BB #2. That is, the CPU #1A of the BB #1 does not compete with the CPUs #0B and #0C of the BB #0 and may take the lock of the buffer area 25-1.

The CPU #1A randomly selects any one priority from the priorities "1" and "30" which are previously set in the BB #1 and performs interrupt notification accompanied by the selected priority to the CPU #2A.

In the BB #2, when the CPU (#1A) receives the interrupt notification of the cross call from another CPU 101, the CPU #1A may know which buffer area 25 BB 100 corresponds to is updated, by referring to the notified priority.

That is, in the BB #2, the CPU #2A processes data of the buffer area 25-0 corresponding to the BB #0 when the priority notified by the interrupt notification of the cross call is "0" or "31". Similarly, the CPU #2A processes data of the buffer area 25-1 corresponding to the BB #1 when the priority notified by the interrupt notification of the cross call is "1" or "30".

As such, the CPU #2A verifies only the status 2510 of the buffer area 25 corresponding to the notified priority and may read out the data from the buffer area 25 in a short time and rapidly process the cross call.

As such, according to the information processing apparatus 1 as one example of the first embodiment, the transmission destination CPU 101 may specify which BB 100 the interrupt is from by referring to the priority notified by the interrupt notification of the cross call. As a result, the CPU 101 may read out the data from the buffer area 25 within a short time and rapidly process the cross call.

Further, in regard to cross calls respectively performed from other BBs 100, cross call access competition by the transmission source CPUs 101 of the respective BBs 100 to the buffer area 25 of the transmission destination CPU 101 may be avoided.

As such, processing delay of CPU communication by access competition among the CPUs 101 may be resolved and rapid interCPU communications in a large configuration may be implemented. As a result, occurrence of a cross call timeout may be suppressed and the reliability of the apparatus may be improved.

Further, a plurality of priorities (first priority and second priority) are provided for each BB 100, and the processing priority setting unit 13 notifies the priority randomly selected from the priorities to the transmission destination CPU 101 by the interrupt notification of the cross call. As a result, continuously processing some BBs 100 preferably may be avoided and occurrence of a situation in which processing from a specific BB 100 continuously takes a time may be suppressed.

Further, in the buffer area 25, the first data 251a and the second data 251b are placed to become each line on a cache. In addition, the first data 251a includes the status 2510 and the second data 251b includes the data 252 and the data_ready 2520.

As a result, simultaneous access by the transmission source CPU 101 and the transmission destination CPU 101 to the same cache line may be prevented and occurrence of lock competition for accessing the buffer area 25 may be suppressed. That is, false sharing by the transmission source CPU 101 and the transmission destination CPU 101 may be avoided and processing delay caused by the lock competition by the transmission source CPU 101 and the transmission destination CPU 101 may be relieved.

Further, the data 252 and the data_ready 2520 are provided in the second data 251b, and as a result, the data 252 and the data_ready 2520 are placed on the same line on the cache and the transmission destination CPU 101 may obtain the data 252 and the data_ready 2520 through one access. Therefore, an access frequency to the buffer area 25 may be reduced.

(B) Second Embodiment

In the information processing apparatus 1 of the first embodiment, the buffer area 25 is provided for each BB 100 in the priority memory 102 of the transmission destination CPU 101 and the invention is not limited thereto.

In an information processing apparatus 1 of the second embodiment, the buffer area 25 is provided in each priority memory 102 of the transmission source CPU 101 and the transmission source CPU 101 stores data transferred to the transmission destination CPU 101 in the buffer area 25 managed by the transmission source CPU 101. Note that, the other parts are configured similarly to the information processing apparatus 1 of the first embodiment. That is, in the first embodiment, the buffer area is present in the transmission destination, while in the second embodiment, an example in which the buffer area is present in the transmission source will be described below.

In the information processing apparatus 1 of the second embodiment, when data is transferred from the transmission source CPU 101 to the transmission destination CPU 101, the data transmission processing unit 12 writes transmission data in the data 252 of the buffer area 25 of the transmission source CPU 101 to update the data 252, in the transmission source CPU 101.

FIG. 11 is a diagram describing a method for transferring data among the CPUs 101 in the information processing apparatus 1 as one example of the second embodiment.

In the second embodiment, different priority information 1021 is set for each CPU 101, instead of the BB 100 of the first embodiment. Further, even in the second embodiment, two types of priorities (first priority information and second priority information) are set as the priority information, similarly to the first embodiment.

The priorities set for each CPU 101 are set as unique values which are not duplicated with each other with respect to each CPU 101. As a result, the transmission source CPU 101 may be specified from the priorities.

Further, in the second embodiment, the buffer area 25 is provided for each CPU 101 in the BB 100. As a result, the priority serves as identification information to specify the buffer (storage area) 25.

In the example illustrated in FIG. 11, priority X (for example, X=0 or X=31) is set in the CPU 101 (#0A) and priority Y (for example, Y=1 or Y=30) is set in the CPU #1A.

Further, for convenience, although not illustrated, different priorities are set even in other CPUs #0B and #0C, respectively.

In addition, in the BB #0, each of the CPUs #0A, #0B, and #0C intends to transfer data to the CPU #2A of the BB #2.

The CPU #0A obtains lock of a buffer area 25-0A of the its own priority memory 102 and stores data in the buffer area 25-0A. In this case, the CPU #0A may obtain the lock of the buffer area 25-0A without competing with other CPUs 101 (for example, the CPUs #0B and #0C). The CPU #0A randomly selects any one priority from the priorities "0" and "31" which are previously set in the BB #0 and performs interrupt notification accompanied by the selected priority X to the CPU #2A.

In the BB #0, the CPU #0B obtains lock of a buffer area 25-0B of its own priority memory 102, stores data in the buffer area 25-0B, and further, the CPU #0C obtains lock of a buffer area 25-0C of its own priority memory 102 and stores data in the buffer area 25-0C.

Even the CPUs #0A to #0C may obtain the lock of the buffer areas 25-0B and 25-0C without competing with other CPUs 101.

In the BB #1, the CPU #1A obtains the lock of the buffer area 25-1A of its own priority memory 102 and stores data in the buffer area 25-1A. In this case, the CPU #1A may obtain the lock of the buffer area 25-0A without competing with other CPUs 101 (for example, the CPUs #0B and #0C).

The CPU #1A randomly selects any one priority from the priorities "1" and "30" which are previously set in the BB #1 and performs interrupt notification accompanied by the selected priority Y to the CPU #2A.

As such, in the information processing apparatus 1 as one example of the second embodiment, each CPU 101 may obtain the lock of the buffer area 25 without competing with other CPUs 101 as well as the same operational effect as the first embodiment may be acquired. That is, in each CPU 101, since competition for obtaining the lock for writing data in the buffer area 25 does not occur and delay of processing by the lock competition does not occur, the processing may be rapidly performed.

(C) Others

Further, a technique of a disclosed technology is not limited to the foregoing embodiments and various modifications may be made within the scope without departing from the spirit of the embodiment. Each configuration and each processing of the embodiments may be selected as necessary or may be appropriately combined.

For example, in each embodiment, unique priority is set for each node 100 or each CPU 101 and the transmission source node 100 or CPU 101 is specified based on the priority, but the invention is not limited thereto. For example, instead of the priority, unique identification information may be set for individual nodes 100 or CPUs 101, respectively, and the transmission source CPU 101 may notify the identification information to the transmission destination CPU 101 to specify the transmission source node 100 or CPU 101 in the transmission destination CPU 101.

Further, in the second embodiment, the buffer area 25 is provided for each CPU 101 in the transmission source BB 100, but the invention is not limited thereto. That is, in the transmission source BB 100, the plurality of CPUs 101 may include a common buffer area 25. As a result, in the transmission source BB 100, the size of the buffer area 25 may be decreased.

Further, in the second embodiment, different priority information 1021 is set for each CPU 101, but the invention is not limited thereto and similarly to the first embodiment, different priority information 1021 may be set for each BB 100.

The embodiment may be worked and manufactured by those skilled in the art by the aforementioned disclosure.

According to the embodiment, the communications between the computing devices in the information processing apparatus including the plurality of computing devices can be efficiently performed.

All examples and conditional language recited herein are intended for pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An information processing apparatus, comprising:
a plurality of computing devices; and,
a plurality of storage areas, wherein
a first computing device among the plurality of computing devices includes,
   a data transmission processing unit transmitting data to be transferred to another computing device to a first storage area among the plurality of storage areas, and
   an interrupt generating unit generating an interrupt corresponding to transmission of data by the data transmission processing unit with respect to a transmission destination of the data together with identification information specifying the storage area, and
a second computing device among the plurality of computing devices includes, an interrupt processing unit specifying from which computing device the interrupt is requested based on the identification information received together with the interrupt when receiving the interrupt, and a data receiving unit reading out data from the first storage area corresponding to the computing device specified by the interrupt processing unit among the plurality of storage areas, the information processing apparatus further comprising a plurality of nodes each including one or more computing devices, a first node among the plurality of nodes has the first computing device, the interrupt generating unit generates the interrupt corresponding to the transmission of the data by the data transmission processing unit with respect to the transmission destination of the data together with node identification information specifying the first node, a second node among the plurality of nodes has storage areas respectively corresponding to the plurality of nodes and the second computing device, the interrupt processing unit specifies from which node the interrupt is requested based on the node identification information received together with the interrupt when receiving the interrupt from the first node, and the data receiving unit reads out the received data from the first storage area corresponding to the node specified by the interrupt processing unit among the plurality of storage areas provided to correspond to the plurality of nodes, respectively, different priorities are set one for each node, and the node identification information includes priority information indicating the priority.

2. The information processing apparatus according to claim 1, wherein:

the first computing device has a cross call reception processing unit receiving a cross call from an operating system (OS) executed on the first computing device, the data transmission processing unit transmits data to be transferred to a computing device of a transmission destination of the cross call received by the cross call reception processing unit to the first storage area of the plurality of storage areas, and the interrupt generating unit generates the interrupt with respect to the computing device of the transmission destination of the cross call received by the cross call reception processing unit.

3. The information processing apparatus according to claim 1, wherein:

the first computing device has a cross call reception processing unit receiving a cross call from an operating system (OS) executed on the first computing device, the data transmission processing unit transmits data to be transferred to a computing device of a transmission destination of the cross call received by the cross call reception processing unit to the first storage area of the plurality of storage areas, and the second computing device includes a data storage processing unit storing the data read out from the first storage area by the data receiving unit in an OS storage area corresponding to the OS executed by the computing device of the transmission destination of the cross call.

4. The information processing apparatus according to claim 1, wherein:

a hypervisor managing the OS throughout the plurality of nodes includes the identification information, and the hypervisor receives a cross call from an OS, the hypervisor judges the first storage area storing data by referring to the identification information in each of a transmission source computing device and a transmission destination computing device of the cross call.

5. The information processing apparatus according to claim 1, wherein:

the priority information has first priority information indicating a first priority and second priority information indicating a second priority lower than the first priority set in any one of the plurality of nodes, the first computing device includes a selection unit randomly selecting any one of the first priority information and the second priority information, and the interrupt generating unit notifies the transmission destination of the data of any one of the first priority information and the second priority information selected by the selection unit as the node identification information.

6. The information processing apparatus according to claim 1, wherein:

the storage area includes a first management area performing an access to change a status of the corresponding storage area from the first computing device and a second management area performing an access for the second computing device to acquire data on different cache lines.

7. The information processing apparatus according to claim 1, further comprising:

a plurality of nodes each including one or more computing devices, wherein a first node among the plurality of nodes has the first computing device and a storage area corresponding to the first computing device, a second node among the plurality of nodes has the second computing device, the interrupt processing unit specifies from which computing device the interrupt is requested based on the identification information received together with the interrupt when receiving the interrupt from the first node, and the data receiving unit reads out the received data from the first storage area corresponding to the computing device specified by the interrupt processing unit among the plurality of storage areas provided to correspond to the plurality of computing devices, respectively.

8. An information processing method in an information processing apparatus including a plurality of computing devices and a plurality of storage areas, comprising:

by a first computing device among the plurality of computing devices, transmitting data to be transferred to another computing device to a first storage area among the plurality of storage areas; and generating an interrupt corresponding to transmission of the data with respect to a transmission destination of the data together with identification information specifying the storage area, and by a second computing device among the plurality of computing devices, specifying from which computing device the interrupt is requested based on the identification information received together with the interrupt when receiving the interrupt; and reading out data from the first storage area corresponding to the computing device specified by an interrupt processing unit among the plurality of storage areas, wherein the information processing apparatus includes a plurality of nodes each including one or more computing devices, and a first node among the plurality of nodes has the first computing device, the information processing method further comprises; generating an interrupt corresponding to transmission of the data with respect to a transmission destination of the data together with node identification information specifying the corresponding first node, a second node among the plurality of nodes has storage areas respectively corresponding to the plurality of nodes and the second computing device, the information processing method further comprises; specifying from which node the interrupt is requested based on the node identification information received together with the interrupt when receiving the interrupt from the first node, and reading out the received data from the first storage area corresponding to a specified node among a plurality of storage areas provided to correspond to the plurality of nodes, respectively, different priorities are set one for each node, and the node identification information includes priority information indicating the priority.

9. The information processing method according to claim 8, further comprising:

by the first computing device, receiving a cross call from an operating system (OS) executed on the corresponding first computing device;

storing data to be transferred to a computing device of a transmission destination of the received cross call in a first storage area among the plurality of storage areas; and generating the interrupt with respect to the computing device of the transmission destination of the cross call received by a cross call reception processing unit.

10. The information processing method according to claim 8, further comprising:

by the first computing device, receiving a cross call from an operating system (OS) executed on the corresponding first computing device;

by the first computing device, storing data to be transferred to a computing device of a transmission destination of the received cross call in a first storage area among the plurality of storage areas; and by the second computing device, storing the data read out from the storage area in an OS storage area corresponding to the OS executed by the computing device of the transmission destination of the cross call.

11. The information processing method according to claim 8, further comprising:

a hypervisor managing the OS throughout the plurality of nodes includes the identification information, when the hypervisor receives a cross call from the OS, the hypervisor judges the first storage area storing data by referring to the identification information in each of a transmission source computing device and a transmission destination computing device of the cross call.

12. The information processing method according to claim 8, further comprising:

wherein the priority information has first priority information indicating a first priority and second priority information indicating a second priority lower than the first priority set in any one of the plurality of nodes, by the first computing device, randomly selecting any one of the first priority information and the second priority information, and notifying the transmission destination of the data of any one of the first priority information and the second priority information selected as the node identification information.

13. The information processing method according to claim 8, wherein:

the storage area includes a first management area performing an access to change a status of the corresponding storage area from the first computing device and a second management area performing an access for the second computing device to acquire data on different cache lines.

14. The information processing method according to claim 8, further comprising:

wherein the information processing apparatus includes a plurality of nodes each including one or more computing devices, a first node among the plurality of nodes has the first computing device and a storage area corresponding to the corresponding first computing device, and a second node among the plurality of nodes has the second computing device, specifying from which computing device the interrupt is requested based on the identification information received together with the interrupt when receiving the interrupt from the first node, and reading out the received data from the first storage area corresponding to a specified computing device among the plurality of storage areas provided to correspond to the plurality of computing devices, respectively.

15. A non-transitory computer-readable recording medium having stored therein a program that allows a computer including a plurality of computing devices and a plurality of storage areas to execute processing, comprising, transmitting data to be transferred to another computing device to a first storage area among the plurality of storage areas; and generating an interrupt corresponding to transmission of the data with respect to a transmission destination of the data together with identification information specifying the storage area, wherein the computer includes a plurality of nodes each including one or more computing devices, and a first node among the plurality of nodes has the first computing device, the information processing method further comprises; generating an interrupt corresponding to transmission of the data with respect to a transmission destination of the data together with node identification information specifying the corresponding first node, different priorities are set one for each node, and the node identification information includes priority information indicating the priority.

16. An information processing apparatus, comprising:

a plurality of computing devices; and a plurality of storage areas, wherein a first computing device among the plurality of computing devices includes, a data transmission processing unit transmitting data to be transferred to another computing device to a first storage area among the plurality of storage areas, a processing priority selecting unit selecting any one of two priorities as a priority of an interrupt corresponding to transmission of data by the data transmission processing unit, and an interrupt generating unit generating an interrupt corresponding to transmission of data by the data transmission processing unit with respect to a transmission destination of the data together with identification information specifying the storage area and the selected priority, and a second computing device among the plurality of computing devices includes, an interrupt processing unit specifying from which computing device the interrupt is requested based on the identification information received together with the interrupt when receiving the interrupt, and a data receiving unit reading out data from the first storage area corresponding to the computing device specified by the interrupt processing unit among the plurality of storage areas, the information processing apparatus includes a plurality of nodes each including one or more computing devices, and a first node among the plurality of nodes has the first computing device, the interrupt generating unit generates the interrupt corresponding to the transmission of the data by the data transmission processing unit with respect to the transmission destination of the data together with node identification information specifying the first node, a second node among the plurality of nodes has storage areas respectively corresponding to the plurality of nodes and the second computing device, the interrupt processing unit specifies from which node the interrupt is requested based on the node identification information received together with the interrupt when receiving the interrupt from the first node, and the data receiving unit reads out the received data from the first storage area corresponding to the node specified by the interrupt processing unit among the plurality of storage areas provided to correspond to the plurality of nodes, respectively, different priorities are set one for each node, and the node identification information includes priority information indicating the priority.

\* \* \* \* \*